(12) United States Patent
Ambrosina et al.

(10) Patent No.: US 6,418,797 B1
(45) Date of Patent: Jul. 16, 2002

(54) APPARATUS AND METHOD FOR SENSING POWER IN A BICYCLE

(75) Inventors: Jesse Ambrosina, Somerville; Gerhard Pawelka, Lexington, both of MA (US)

(73) Assignee: Graber Products, Inc., Madison, WI (US)

( * ) Notice: Subject to any disclaimer, the term of this patent is extended or adjusted under 35 U.S.C. 154(b) by 0 days.

(21) Appl. No.: 09/102,940

(22) Filed: Jun. 23, 1998

Related U.S. Application Data

(60) Provisional application No. 60/076,746, filed on Mar. 4, 1998.

(51) Int. Cl.[7] .................................................. G01L 3/02
(52) U.S. Cl. ................................................... 73/862.29
(58) Field of Search ........................... 73/862.31, 118.1, 73/862.08, 862.191, 862.29, 379.07

(56) References Cited

U.S. PATENT DOCUMENTS

| | | | |
|---|---|---|---|
| 3,599,482 A | * 8/1971 | Rundell | 73/862.326 |
| 3,927,559 A | * 12/1975 | Costa et al. | 73/862.08 |
| 4,020,918 A | * 5/1977 | Houskamp et al. | 180/168 |
| 4,062,421 A | * 12/1977 | Weber | 180/205 |
| 4,141,248 A | 2/1979 | Bargenda | 73/379 |
| 4,297,877 A | 11/1981 | Stahl | 73/146 |
| 4,423,630 A | 1/1984 | Morrison | 73/379 |
| 4,436,433 A | 3/1984 | Barnes | 366/152 |
| 4,625,551 A | 12/1986 | Carnielli | 73/379 |
| 4,811,612 A | 3/1989 | Mercat | 73/862.34 |
| 4,875,379 A | 10/1989 | Rohs et al. | 73/862.34 |
| 4,966,380 A | 10/1990 | Mercat | 280/259 |
| 5,016,478 A | 5/1991 | Mercat | 73/862.19 |
| 5,018,392 A | 5/1991 | Mercat | 73/862.19 |
| 5,027,303 A | 6/1991 | Witte | 364/511 |
| 5,031,455 A | 7/1991 | Cline | 73/379 |
| 5,065,633 A | 11/1991 | Mercat | 73/862.34 |
| 5,167,159 A | 12/1992 | Lucking | 73/862.451 |
| 5,202,627 A | 4/1993 | Sale | 324/166 |
| 5,256,115 A | * 10/1993 | Scholder et al. | 482/6 |
| 5,257,540 A | 11/1993 | Bower et al. | 73/379.07 |
| 5,591,908 A | 1/1997 | Reid | 73/379.07 |

FOREIGN PATENT DOCUMENTS

| | | |
|---|---|---|
| DE | 3150149 A1 | 6/1983 |
| GB | 2 109 568 A | 11/1972 |
| GB | 2 286 055 A | 1/1995 |

* cited by examiner

*Primary Examiner*—Max Noori
(74) *Attorney, Agent, or Firm*—Boyle, Fredrickson, Newholm, Stein & Gratz, S.C.

(57) ABSTRACT

A measuring apparatus and method for measuring power in a bicycle are described. The hub of the driven wheel of the bicycle includes one or more components such as an inner hub member, an outer hub member or a linking member which couple the rotational torque through the wheel to rotate the wheel. A sensor such as one or more strain gauges is mounted on one of the components that couple torque through the wheel such that strain in the torque coupling component is detected. The detected strain is used to determine applied torque which is used to determine power applied to the driven wheel of the bicycle. Because the torque coupling component is mounted in the hub in the path along which torque is coupled through the wheel, the sensor rotates with the wheel as it detects the applied torque.

56 Claims, 12 Drawing Sheets

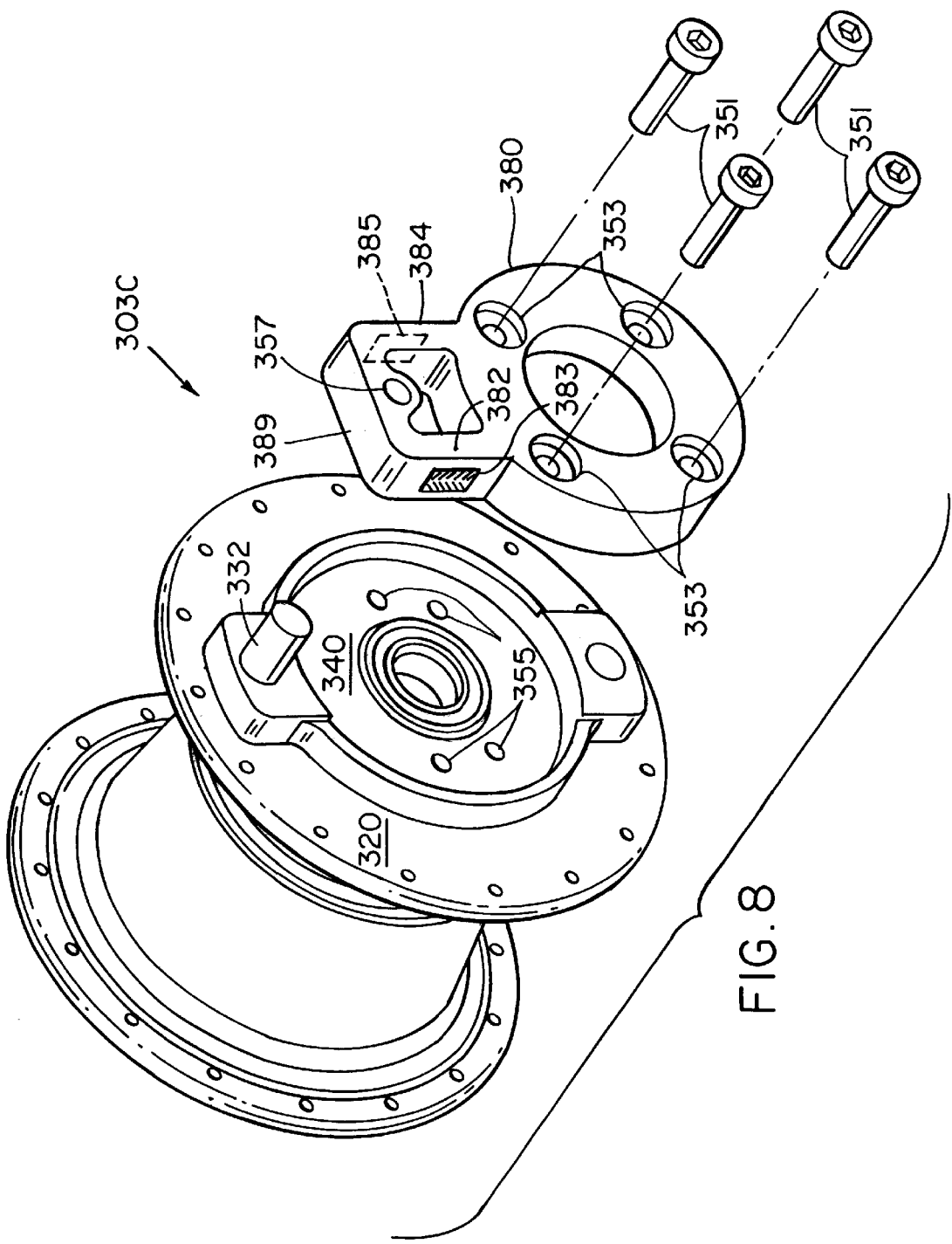

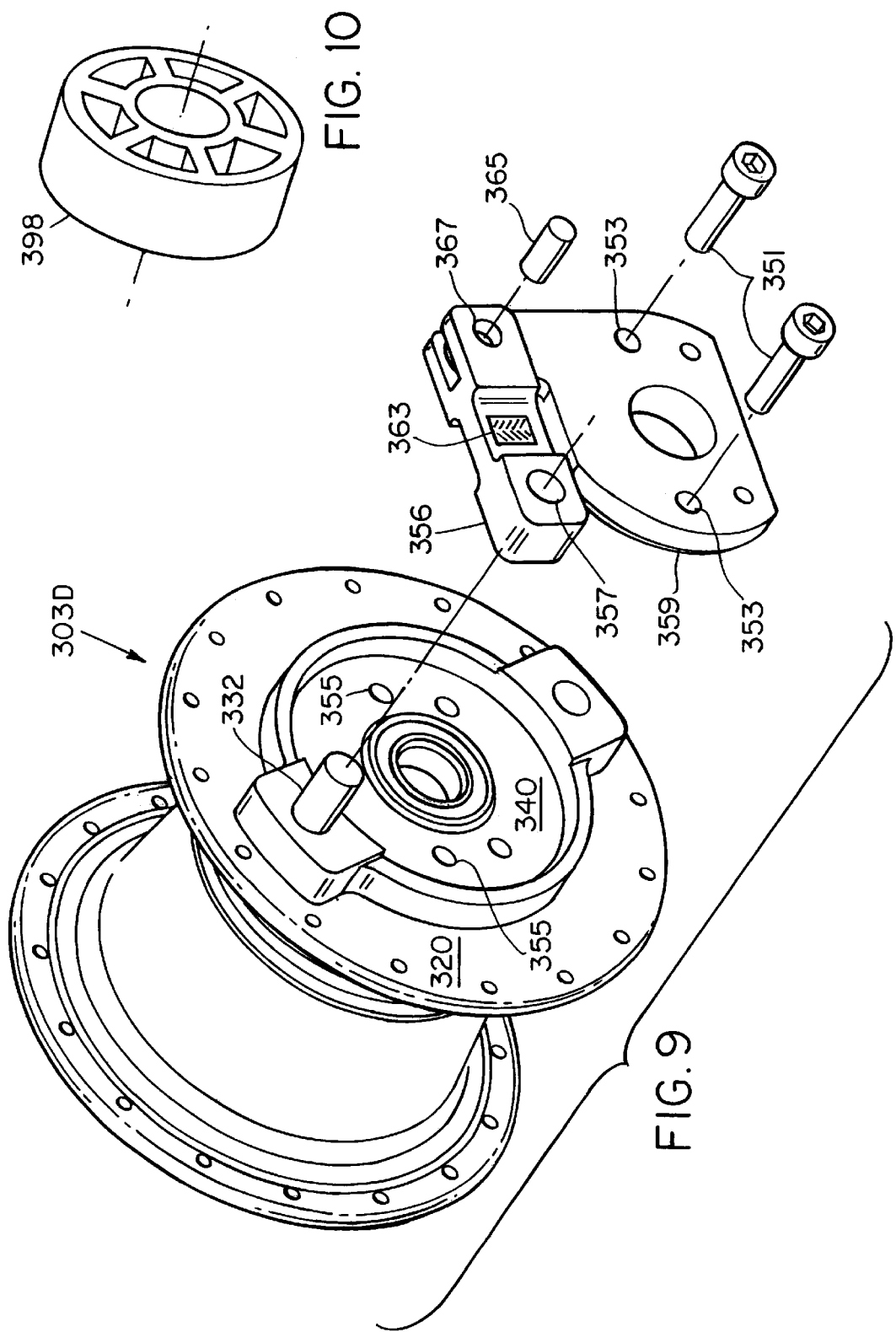

APPARATUS AND METHOD FOR SENSING POWER IN A BICYCLE

RELATED APPLICATIONS

This application is based on U.S. Provisional Patent Application serial No. 60/076,746, filed on Mar. 4, 1998.

BACKGROUND OF THE INVENTION

Power measurement devices for bicycles typically fall into one of two basic categories: devices that measure torque and angular velocity in driving components of a bicycle, such as pedals and crank arms, and devices that measure torque and angular velocity in driven components such as the chain rings, chain and rear wheel. Power P is the product of torque T and angular velocity ω, that is, P=T×ω. Similarly, power P can be defined as the product of force F and velocity v, i.e., P=F×v.

Certain prior devices that measure torque in driving components have inherent inaccuracies with regard to measuring either the true power exerted by a bicyclist or the true power transmitted to the driven wheel of a bicycle. The total force exerted by a bicyclist will include forces that are applied tangentially to a driving component, e.g., crank arm, and forces that are applied either in another direction in the plane of rotation or in a plane that is perpendicular to the plane of rotation. The portion of force that is tangential to the direction of rotation, when multiplied by the distance from the center of rotation to yield torque and then multiplied by angular velocity, represents a measure of power transmitted to a driven wheel. However, the forces that are in another direction in the plane of rotation and the forces that are perpendicular to the plane of rotation cannot be added to the forces causing rotation, multiplied by angular velocity, and represented as a true measure of power transmitted to the driven wheel. Nor can the total force be multiplied by the angular velocity of a driven component to represent the power exerted by the bicyclist.

U.S. Pat. No. 4,141,248 to Bargenda discloses a torque measurement means which includes a wire strain gauge operatively connected to each of the foot pedal armatures of a bicycle and connected in series in a strain gauge bridge. This means of measuring torque has limited accuracy since it is known that the force exerted into the foot pedals and resolved by the instrumented aramtures is not limited purely to the measurement of force that will be transmitted to the driven wheel. The instrumented armatures will also be affected by significant forces that are perpendicular to the desired torque measurement thereby diluting the significance of the measured power that is assumed to be transmitted back to the driven wheel. Although this means provides a measurement of the exerted forces produced by a cyclist, it is not an accurate measurement of force and power that is usefully produced and efficiently transmitted to the driven wheel.

U.S. Pat. No. 4,423,630 to Morrison discloses a means of measuring power by measuring the force in a driving foot pedal of a bicycle. This method of force measurement also exhibits inaccuracies in that a significant proportion of force registered by the pedals is not transmitted via the bicycle chain.

In general, devices that measure torque in driven components have the potential of registering a more accurate measure of torque and power usefully transmitted by the cyclist to the bicycle wheel. It should be noted that this is not the same as the power exerted by the cyclist. Some of these prior devices include methods of detecting torque in the hub of the driven wheel. The torque in the hub is usually detected by some indirect means such as by optically detecting relative deflection between components in the wheel and converting the detected deflection to a torque measurement.

U. S. Pat. No. 4,811,612 to Mercat discloses a method and device for detecting torque in the rear wheel of a bicycle. Under applied torque to the wheel, special radial spokes deform such that the rim of the wheel angularly deflects relative to the hub of the wheel. Using pairs of infrared-radiation-emitting diodes and photo diodes mounted adjacent to the wheel hub and rim, the device optically detects the angular position of the rim compared to that of the hub by measuring delay in the signals generated by the photo diodes.

U.S. Pat. No. 4,966,380 to Mercat discloses a device used to detect torque in the hub of the rear wheel of a bicycle. The device includes a pair of mating rotatable members which rotate about the axle of the bicycle. The mating members include spiral ramps in contact with each other such that as torque is applied to the hub, one of the mating members is displaced axially along the rotational axis of the hub against a stationary flexible disk. A strain gauge on the stationary flexible disk detects the deflection of the disk. A processor converts the stationary disk deflection measurement into a torque measurement. The device of the '380 patent addresses a problem seen by Mercat as being associated with applying a sensor to the rotating portion of the hub. Mercat therefore uses a stationary detection member, not in the rotational portion or torque-carrying path of the hub, to detect torque in the hub.

U. S. Pat. No. 5,065,633 to Mercat discloses another device used to detect torque in a bicycle hub. The device includes an outer hub and an inner driving axle which are rotatably mounted over the stationary axle of the bicycle and are fixedly attached to each other at a fixed end of the hub and are allowed to rotate relative to each other under applied torque at the opposite free end of the hub. Torque applied to the driving axle is coupled to the outer hub at the fixed end of the hub to rotate the bicycle wheel.

In the '633 patent, the torque measuring device is coupled off of the torque path to the torque-carrying members, i.e., the driving axle and outer hub, to detect relative deflection between the outer hub and the stationary axle at the free end of the hub. A multiplying arm is pivotally attached at one end to the outer hub and rests against a rotatable carrier element at its other end. Magnets are attached to the carrier element at the free end of the hub and the fixed end of the hub and are located in registration with mating magnetic reed contacts mounted on the stationary axle. When torque is applied to the driving axle, the hub rotates slightly with respect to the driving axle. The multiplying arm pivots to move the carrier element and the magnets on the carrier element at the free end of the hub relative to the magnets at the fixed end of the hub. Signals generated by the stationary reed contacts are analyzed to relate the amount of deflection in the outer hub to applied torque.

U. S. Pat. No. 5,031,455 discloses another device used to detect torque in a bicycle hub. The device includes an inner hub and an outer hub connected by torsion bars. The inner hub is driven into rotation and carries the outer hub and the bicycle wheel into rotation via the torsion bars. A pair of discs mounted to the inner hub and outer hub are used to detect relative rotation between the inner and outer hubs. The discs include a plurality of circumferential openings which are aligned under zero torque but are displaced relative to each other under applied torque. The device uses optical or magnetic sensing to detect the amount of relative displacement, which is in turn related to the applied torque.

All of these devices use indirect means to measure torque. Each detection approach carries out torque detection in elements which are outside the path along which torque is coupled through the bicycle driving system. As a result, certain inaccuracies are inherent to such systems, such as those introduced by losses in coupling the special torque detecting components to the actual wheel driving components. Also, the indirect detection approaches used, i.e., optical, magnetic, can also introduce inaccuracies. These approaches rely heavily on the accuracy of the associated components, e.g., the discs and the openings formed therein. Any inaccuracies in fabrication or assembly of any of these associated components can adversely affect the accuracy of the torque measurement.

Also, these approaches generally require large angular deflections to achieve an accurate measurement of torque in the hub of the driven wheel. These large angular deflections are unacceptable for performance bicyclists. For example, even a full-scale deflection of an ostensibly small angle of 1 degree would translate to a 0.25 inch deflection at the outside of a 27 inch bicycle wheel. Such a deflection would be annoyingly noticeable to a performance cyclist.

SUMMARY OF THE INVENTION

The present invention is directed to an apparatus and method for measuring torque and/or power in a driven wheel, for example, a bicycle wheel. The apparatus of the invention includes a torque coupling member which is mountable within the driven wheel and which couples a rotational driving force through the driven wheel to drive the driven wheel into rotation, that is, the torque coupling member is in the path along which torque is coupled through the wheel. The apparatus also includes a sensing means located on the torque coupling member for generating a signal indicative of strain in the torque coupling member.

In one embodiment, the torque coupling member is mountable in the hub assembly of the wheel. In one particular embodiment, the torque coupling member forms a portion of the hub assembly which couples the torque through the hub assembly to drive the wheel into rotation and rotates with the hub assembly and wheel as the wheel rotates. Hence, in this embodiment, the sensing means generates the signal indicative of strain in the torque coupling member as the torque coupling member rotates in response to the applied torque.

In one embodiment, the hub assembly in accordance with the invention includes a first or outer hub member and a second or inner hub member within the outer hub member. The inner hub member is coupled to a wheel driving member such as a bicycle chain sprocket to couple rotational driving forces into the wheel. The outer hub member is coupled to the outer portion of the wheel such as the bicycle wheel spokes or solid disk. The inner hub member is coupled to the outer hub member such that as the inner hub member is driven by the rotational driving forces, the outer hub member and, therefore, the wheel, are driven into rotation.

The hub members can be coupled by one of several different means. In one embodiment, a link member is attached to both hub members. The link member can be positioned at one or both ends of the combined inner and outer hub member subassembly, or at any position or positions along the length of the subassembly. Alternatively, the inner and outer hub members can be joined by a fastening member which can include one or more screws or pins. The fastening member can also include one or more keys in one of the hub members mating with one or more keyways in the other hub member. In another configuration, the fastening member can include a spline at one end of the inner and outer hub member subassembly. In yet another configuration, the inner and outer hub members are formed as a single unitary piece, such as by molding or machining.

In one embodiment, the sensing means is mounted on the link member that couples the inner and outer hub members together. The sensing means can include one or more strain gauges bonded to one or more bending beams of the link member. Tension and/or compression strain due to bending of the bending members can then be measured to determine the amount of torque applied to the hub. In one embodiment, two bending beams are used. In an alternative embodiment, four are used. Alternatively, the link member can include a shear web region which can be subject to shear and/or bending forces under applied torque. In this embodiment, one or more strain gauges can be bonded to the shear web region of the link member to measure tension and/or compression strain due to the shear and/or bending forces in the link member. These measurements can then be used to obtain a measurement of the applied torque. Bending beams can also be combined with the shear web region in the link member to measure both shear and bending strain.

In another embodiment, the sensing means is mounted on one of the inner and outer hub members. In this embodiment, one of the more rigid configurations for attaching the inner and outer hub members, for example, the screws, pins, keys, spline, or the unitary subassembly, can be used. The sensing means can include one or more strain gauges attached to the inner or outer hub member. In one specific embodiment, the strain gauges are attached to the inner hub member. They can be arranged to measure tension and/or compression strain due to torsional, shear and/or bending forces in the hub member such that torque applied to the hub member can be determined. By using a bearing on one or both ends of the hub assembly, the inner hub can be isolated from all external forces other than the driving torque it is meant to measure.

In accordance with the invention, the strain gauges can be mounted on the torque coupling member, e.g., the link member or the inner hub member, in any one or more of many possible configurations, depending upon the particular type of strain measurement desired. For example, in the case of bending beams on the link member, strain gauges can be oriented to measure tension and/or compression under the bending motion of the beams. In the case of the shear web region on the link member, strain gauges can be mounted to sense tension and/or compression in the shear web region due to shear and/or bending forces. In the case in which the strain gauges are mounted on the hub member, they can be mounted to detect tension and/or compression in the hub member due to torsional, bending and/or shear forces applied to the hub member.

The invention can also include a means for determining the angular velocity of the wheel as it rotates. The angular velocity measurement can be combined with the torque measurement to determine power delivered to the wheel. In one embodiment, the means for determining angular velocity includes a magnetic reed switch mounted on the hub assembly and a stationary magnet mountable in fixed relation to the bicycle axle. As the reed switch passes the magnet, the switch is activated to produce a signal such as a pulse. The signals are analyzed to determine angular velocity of the wheel. The angular velocity can then be used to calculate power delivered to the wheel, the velocity of the bicycle, the distance traveled by the bicycle and other desired parameters.

The electronics required to support the strain, torque, power and angular velocity measurements of the invention can be provided on the hub assembly in accordance with the invention. In one embodiment, an electronics unit is mounted on the hub assembly. The electronics unit can include a battery for powering the electronics and applying the required signal to the strain gauges. Processing, amplification and conversion circuitry and a transmitter, such as a radio frequency (RF) transmitter, can be provided for processing and transmitting strain and angular velocity measurement signals to a receiver, which can then further process the signals and transfer them to a computer. The computer can then provide numerous functions, such as computing torque and power using the strain and angular velocity signals and displaying results in predetermined formats. The electronics unit can include the required circuitry on one or more printed circuit boards and can include a housing to protect the circuitry from environmental hazards.

The apparatus and method of the invention provide numerous advantages over prior approaches. The invention provides more. precise and accurate torque and power measurements because it obtains direct strain measurements from the hub in the actual hub components that couple the applied torque through the wheel using stain sensing means that are inherently more precise and accurate. The inaccuracies introduced by the indirect measurement approaches of prior systems, using sensing means that are applied to torquing components indirectly and are therefore inherently less accurate and precise, are virtually eliminated.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 contains a partial detailed schematic exploded view of a portion of the torque sensing wheel hub of FIG. 4 which illustrates another alternative embodiment of a link in accordance with the invention which uses two bending beams.

FIG. 9 contains a partial detailed schematic exploded view of a portion of the torque sensing wheel hub of FIG. 4 which illustrates another alternative embodiment of a link in accordance with the invention which uses a link plate and a strain link.

FIG. 10 contains a perspective view of one embodiment of a spoked bearing in accordance with the invention.

DETAILED DESCRIPTION OF PREFERRED EMBODIMENTS OF THE INVENTION

Figure 1:
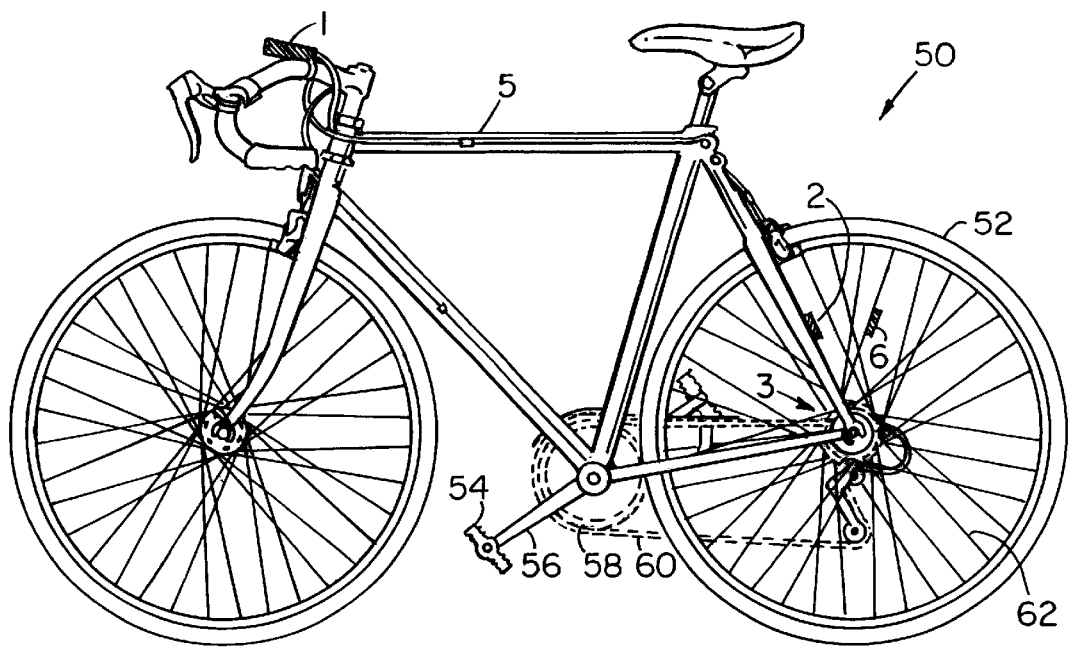
FIG. 1 contains a schematic pictorial view of a bicycle equipped with one embodiment of a power measuring device in accordance with the invention.

FIG. 1 contains a schematic pictorial view of a bicycle 50 equipped with one embodiment of a bicycle power measuring system in accordance with the invention. The bicycle 50 includes a pair of pedals 54 connected by crank arms 56 to a chain ring 58. The chain ring 58 is coupled to the hub assembly 3 of the rear wheel 52 by a chain 60. The bicycle 50 is powered by a cyclist providing rotational forces to the chain ring 58 via the pedals 54 and crank arms 56. The rotation of the chain ring 58 is transferred by the chain 60 to the rear wheel hub assembly 3 which carries the rear wheel 52 into rotation via spokes 62 to drive the bicycle into motion.

The rear wheel hub assembly 3 senses the torque in and angular velocity of the driven rear wheel 52 of the bicycle 50. The detected torque-related and/or angular velocity-related values are processed by electronics within the hub assembly 3 which transmit these values, such as by radio frequency waves, to a receiver module 2, which can be mounted as shown on either the chain stays or seat stays of the bicycle 50. Alternatively, the data values can be transmitted to the receiver module 2 via inductive coupling or infrared link. The receiver module 2 transmits information via conductive wire to the cycle computer 1 which can be mounted on the handlebar of the bicycle 50. In another embodiment, the information can be transferred directly to the computer 1 via RF or infrared link. The computer 1 can use the strain and/or angular velocity information to compute torque and/or power and can display the measured and/or calculated information on a display as desired.

An optional rear wheel magnet 6 can be used in the wheel 52 or in a wheel such as a spare wheel that is not equipped with the hub assembly 3 of the invention. The wheel magnet 6 activates an integral reed switch in the receiver module 2, thereby providing angular velocity, speed and distance measurements to the cycle computer 1 in the absence of, or in addition to, the sensing functions of the hub assembly 3 of the invention.

Figure 2:
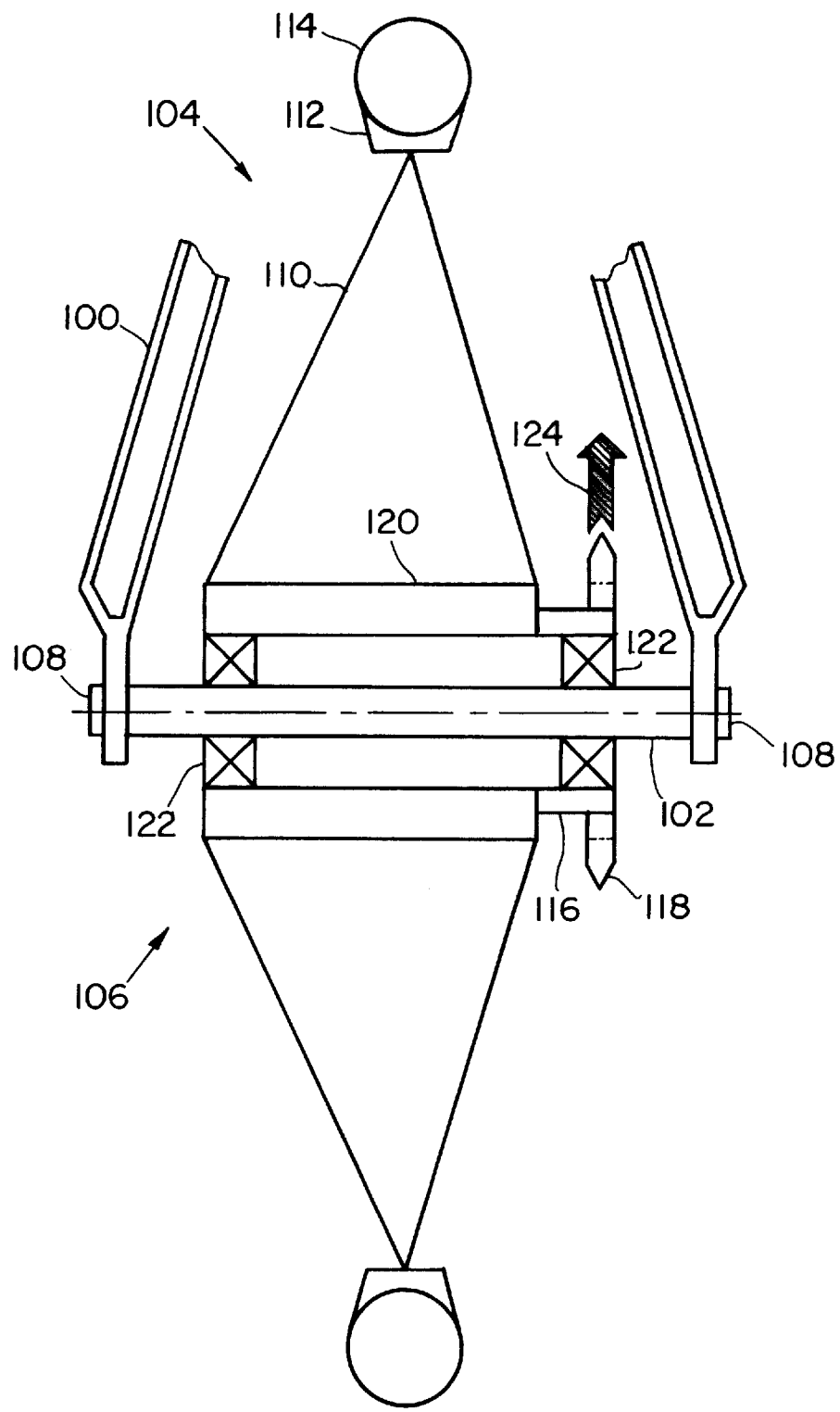
FIG. 2 contains a schematic pictorial and partial cross-sectional view of the rear portion of a prior art bicycle in which the rear wheel is driven to move the bicycle.

FIG. 2 is a schematic pictorial and partial cross-sectional view of the rear portion of a prior art bicycle in which the rear wheel is driven to move the bicycle. The bicycle includes a rear wheel assembly 104 which is mounted by a hub assembly 106 to an axle 102 so as to allow rotation of the wheel assembly relative to the axle 102. The wheel assembly 104 typically includes a tire 114 mounted on a rim 112 which is substantially rigidly coupled to the hub assembly 106 by a wheel support structure 110, which can include metallic spokes, carbon fiber spokes, a solid disc of metallic or other material, or other support configuration.

It should be noted that in the bicycle industry, it is conventional to consider the hub assembly 106 as being part of the wheel assembly 104. In the present application, the hub assembly is referred to both as a device which is part of the wheel and a device that interacts with the wheel. In the latter case, the hub assembly may be considered a part of the wheel which interacts with the remaining parts of the wheel. In any case, where the language of the application may indicate that the hub assembly is not part of the wheel, it is not intended to require that the hub assembly be a separate or separable device. Likewise, where the application language may suggest that the hub assembly is part of the wheel, it is not intended that the hub be required not to be a separate or separable device. Throughout the application, the configuration of the hub and/or wheel assembly will be clear from the context of the particular reference.

The wheel assembly 104 and/or hub assembly 106 also include a central hub body 120, which in some configurations is commonly referred to as a flange body. Where the wheel support structure 110 includes metallic spokes, the spokes are connected between the rim 112 and the flange body 120. Where the support structure 110 includes a solid disc, the central hub body 120 can be formed integrally with the support structure 110.

The central hub body 120 is mounted coaxially to the axle 102 by bearings 122, which allow axial rotation of the wheel assembly 104 relative to the axle 102 while preventing lateral translational and other motions of the wheel assembly 104 relative to the axle 102. The axle 102 is held stationary with respect to the bicycle frame 100 by wheel hub attachment members 108, which can be threaded nuts, quick disconnect nuts, portions of a quick release skewer, etc. Hence, the wheel assembly 104 can rotate freely about the axle 102 while the axle 102 and bicycle frame 100 are held stationary with respect to each other.

The wheel assembly 104 is driven into rotation about the axle 102 by force applied to a driving device such as a bicycle chain. The chain force is indicated in FIG. 2 by arrow 124. The chain engages a chain sprocket 118, which is held stationary with respect to a free hub member 116. The sprocket can be fixedly mounted to the free hub 116 or it can be formed integrally with the free hub 116. The free hub 116 is mounted to the central hub body 120 of the hub assembly 106 by a ratchet or pawl mechanism such that rotational forces applied to the free hub 116 in one rotational direction will be transferred to the central hub body 120 of the hub assembly 106, thereby exerting rotational forces on the wheel assembly 104 to move the bicycle. The pawl or ratchet mechanism allows the free hub 116 to rotate freely with respect to the central hub body 120 in the opposite rotational direction such that rotational forces applied to the free hub 116 in the opposite direction will not be transferred to the central hub body 120 and, therefore, will not drive the wheel assembly 104 into rotation. Hence, forces in the direction of the arrow 124 are translated into rotational forces applied to a chain sprocket 118. These rotational forces on the sprocket 118 are transferred via the free hub 116 to the central hub body 120 of the hub assembly 106, thus forcing the wheel assembly 104 into rotation.

Figure 3:
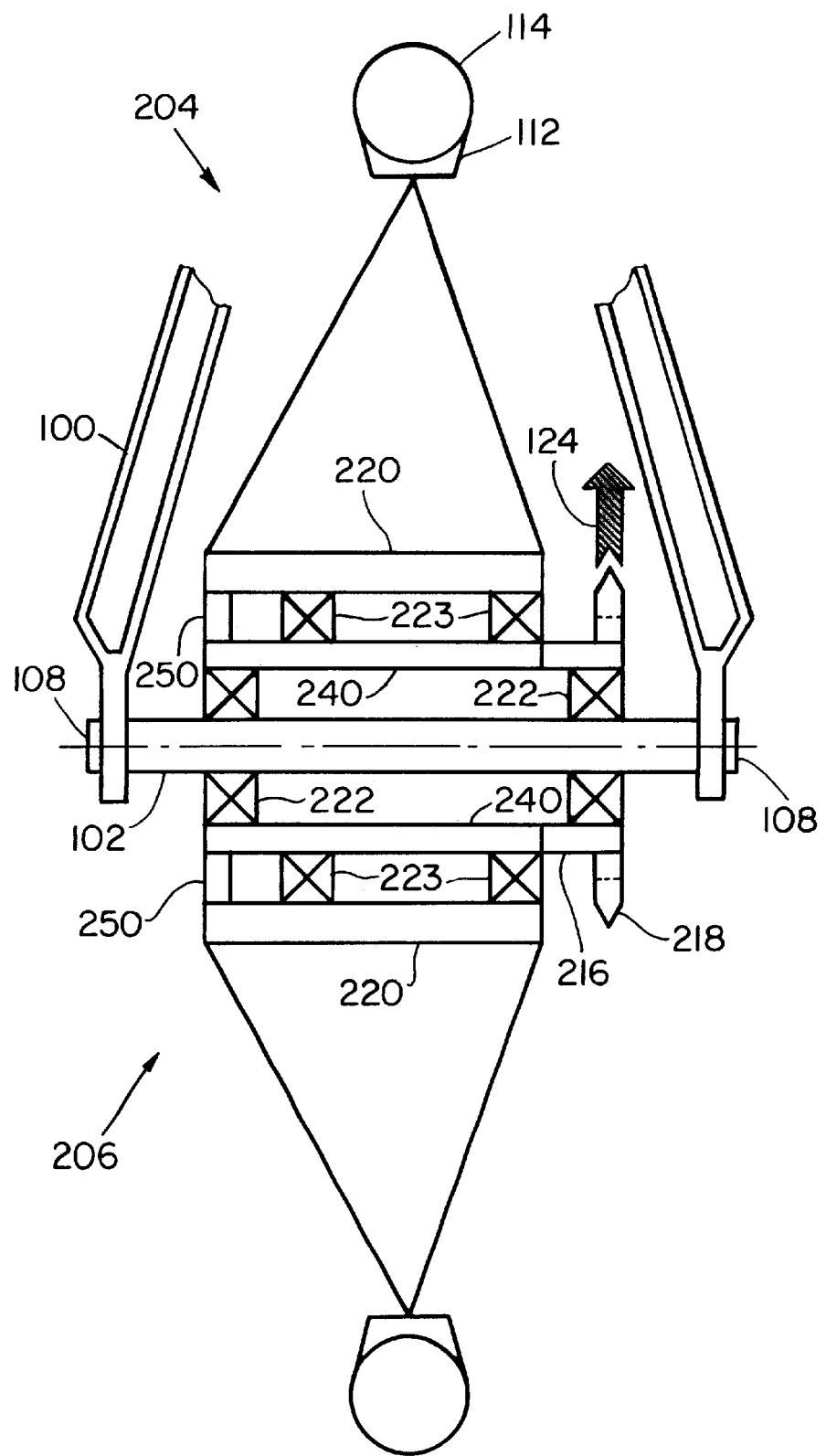
FIG. 3 contains a schematic pictorial and partial cross-sectional view of the rear portion of a bicycle in accordance with the present invention.

In one embodiment of the present invention, the power delivered to rotate the driven wheel of a bicycle and thereby move the bicycle is detected. In one embodiment, the power is detected by sensing strain in one or more components which transfer the chain forces to the wheel assembly, converting the strain measurement into a torque measurement, measuring angular velocity of the wheel, and calculating power from the torque and angular velocity measurements. FIG. 3 contains a schematic pictorial and partial cross-sectional view of the rear portion of a bicycle 50 in accordance with the invention in which power delivered to the rear wheel can be determined. Forces on the chain indicated by arrow 124 are transferred through a chain sprocket 218 to a free hub 216. The free hub 216 is attached by a ratchet or pawl mechanism to an inner hub member 240, which is attached to the axle 102 by bearings 222 which allow the inner hub member 240 to rotate freely relative to the axle. The inner hub member 240 is fixedly attached to the central hub body 220 of the hub assembly 206 by a connection member, shown generally and identified in FIG. 3 by reference numeral 250.

The inner hub member 240 and central hub member 220 are maintained in a coaxial relationship with each other by bearings 223. The bearings 222 and 223 act to isolate the rotational forces applied to the rear wheel hub. Other forces which can introduce inaccuracies into a torque measurement, such as translational forces and chain force components along the axis of rotation, are virtually eliminated from the torque measurement of the invention described herein.

As in the prior art configuration of FIG. 2, rotational forces on the free hub 216 in one direction are transferred to the wheel assembly 204 to rotate the wheel assembly 204 about the axle 102, which is fixedly attached to the bicycle frame 100 by wheel hub attachment members 108. In the opposite direction, the free hub 216 rotates freely with respect to the wheel assembly 204 such that the forces in the opposite direction are not transferred to the wheel assembly 204 to cause it to rotate.

The connection member 250 represents some means by which the inner hub member 240 can be attached to the central hub body 220. In one embodiment, described below in detail, the connection member 250 can include a linking device fixedly attached between the inner hub member 240 and the central hub body 220. In other embodiments, also described below in detail, the connection member 250 represents a substantially rigid connection which can be, for example, one or more screws, one or more pins, one or more keyways with keys, a spline connection between the two hub members 240 and 220, pins, threads, etc. The connection member 250 can also represent that the inner hub member 240 and central hub body 220 are integrally formed as a single piece, such as by molding, machining or other means.

Hence, in one embodiment, torque is coupled through the wheel 204 along a path formed by components which include the chain sprocket 218, the free hub 216, the inner hub member 240, the connection member 250, the central hub body 220 and the wheel support structure 110. In the present invention, power delivered to rotate the wheel assembly 204 can be determined from a measurement of strain in one or more of these elements which transfer the rotational forces through the wheel assembly 204. For example, the connection member 250 can be equipped with one or more strain gauges to obtain the strain measurement. Specifically, where the connection member 250 is a linking device used to connect the inner hub member 240 and the central hub body 220, strain in the linking device can be measured by strain gauges on the linking device. This embodiment is described below in detail. In another embodiment described below, where the inner hub member 240 and the central hub body 220 are connected by some substantially rigid means such as screws, pins, keys or a spline, or where the inner hub member 240 and the central hub body 220 are formed as a single piece, strain in the inner hub member 240 can be measured by strain gauges on the inner hub member 240. Also, in the case where the connection member 250 is substantially rigid, only a single bearing 223 may be used.

Figure 4:
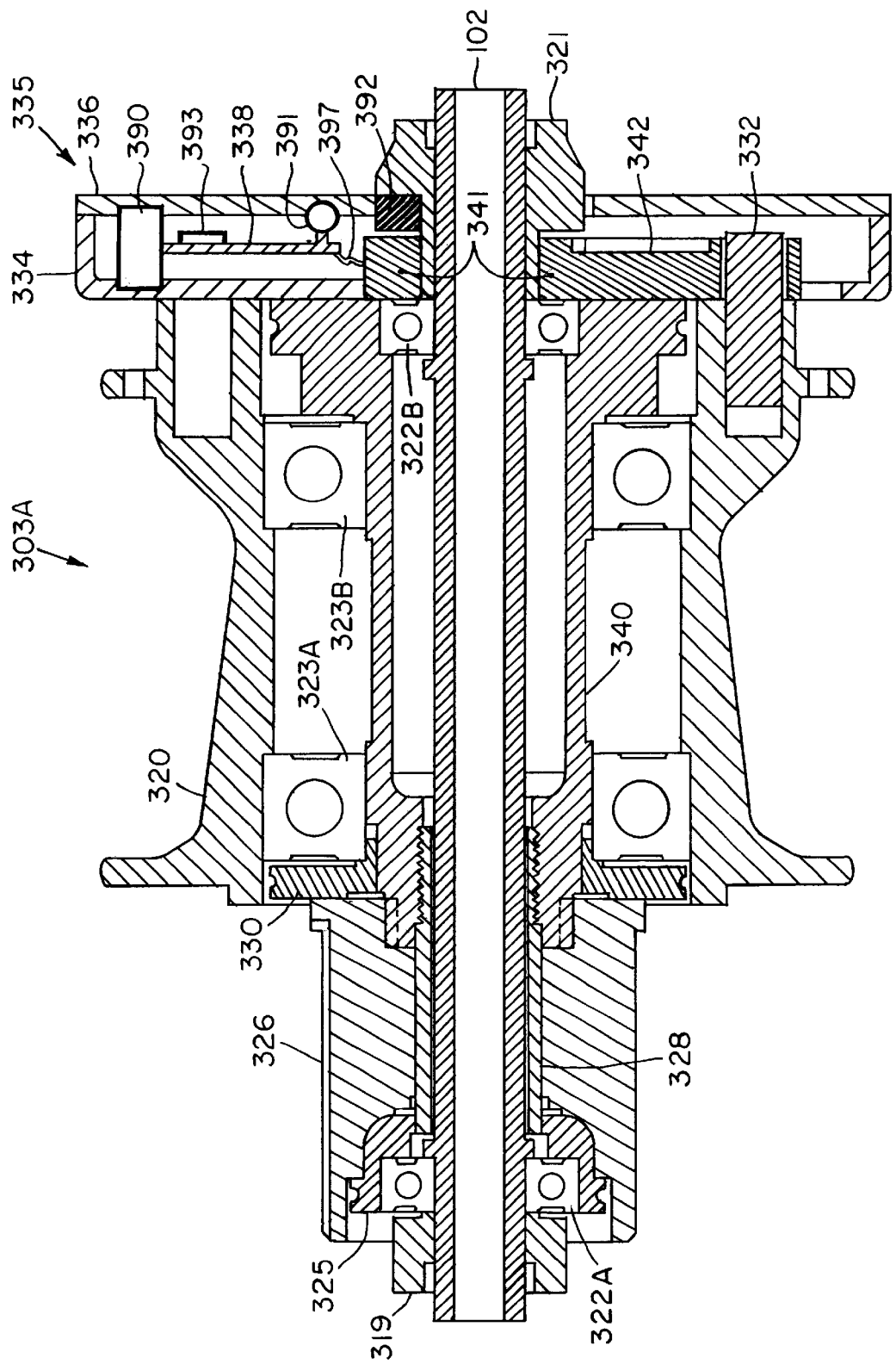
FIG. 4 contains a detailed schematic cross-sectional view of one embodiment of a torque sensing wheel hub in accordance with the invention.
Figure 5:
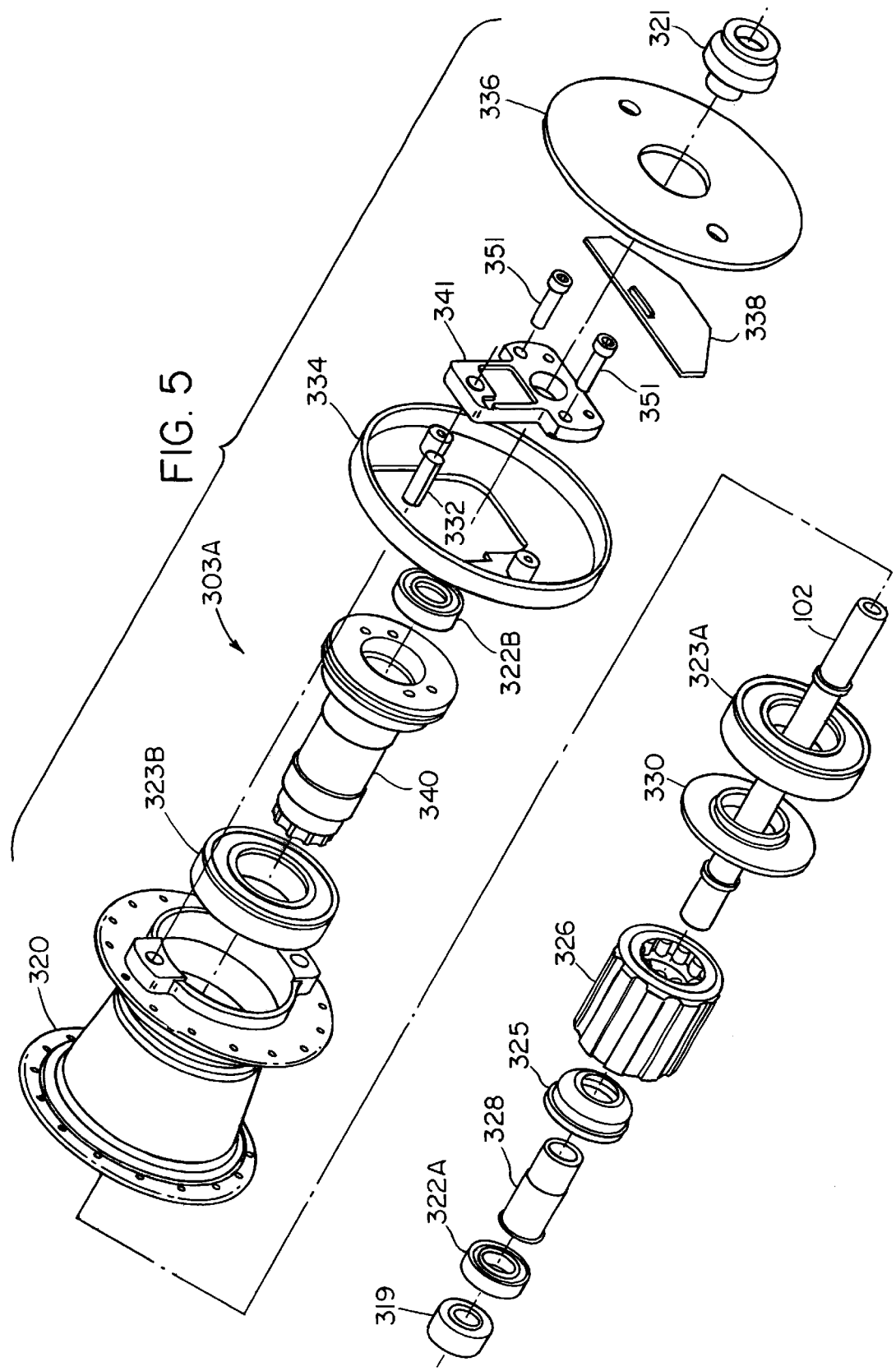
FIG. 5 contains a schematic exploded view of the torque sensing wheel hub of FIG. 4.

FIG. 4 contains a schematic cross-sectional view of one embodiment of a hub assembly 303A in accordance with the invention. FIG. 5 is a schematic exploded view of the hub assembly 303A of FIG.4. As shown in FIGS. 4 and 5, the hub assembly 303A includes a central hub body or flange body portion 320 which surrounds an inner hub member 340. The inner hub member 340 mates with free hub 326 with an integral pawl mechanism (not shown) such that as the free hub 326 is rotated in a first direction, the inner hub member 340 is carried in rotation with the free hub 326 about the axle 102. In the opposite direction, the free hub 326 freely rotates such that, as the free hub body 326 is driven in the second rotational direction, the inner hub member 340 is not carried in rotation.

A free hub fixing bolt 328 is externally threaded such that it threads into the end of the inner hub member 340 to hold the free hub 326 and the inner hub member 340 together. The free hub fixing bolt 328 also holds a bearing adapter 325 in place in the end of the free hub 326. An axle bearing 322A is held within the bearing adapter 325 to hold the hub assembly 303A in coaxial relation with the stationary bicycle axle 102 and to allow the hub assembly 303A to rotate about the axle 102. A drive side spacer 319 is fixedly located over the axle 102 to provide spacing between the end of the hub assembly 303A and the stationary mounting portion of the bicycle, i.e., frame (not shown). A second axle bearing 322B can be mounted inside the opposite end of the inner hub member 340 to provide further coaxial stability of the hub assembly and to allow free rotation of the hub assembly 303A about the stationary axle 102.

The inner hub member 340 is maintained in coaxial relation with the flange body 320 by a pair of outer hub bearings 323A and 323B. The outer hub bearings 323A and 323B are held in position between the inner hub member 340 and the flange body 320 such that relative rotational displacement between the inner hub member 340 and the flange body 320 is isolated as only rotational movement. The outer hub bearings 323A, 323B and the axle bearings 322A, 322B act together to insure that rotational forces and torques are isolated in the hub assembly 303A of the invention. A locking nut 330 maintains the position of the outer hub bearing 323A at the end of the inner hub 340 and flange body 320 subassembly. Forces having components along the rotational axis of the device are eliminated.

Figure 6:
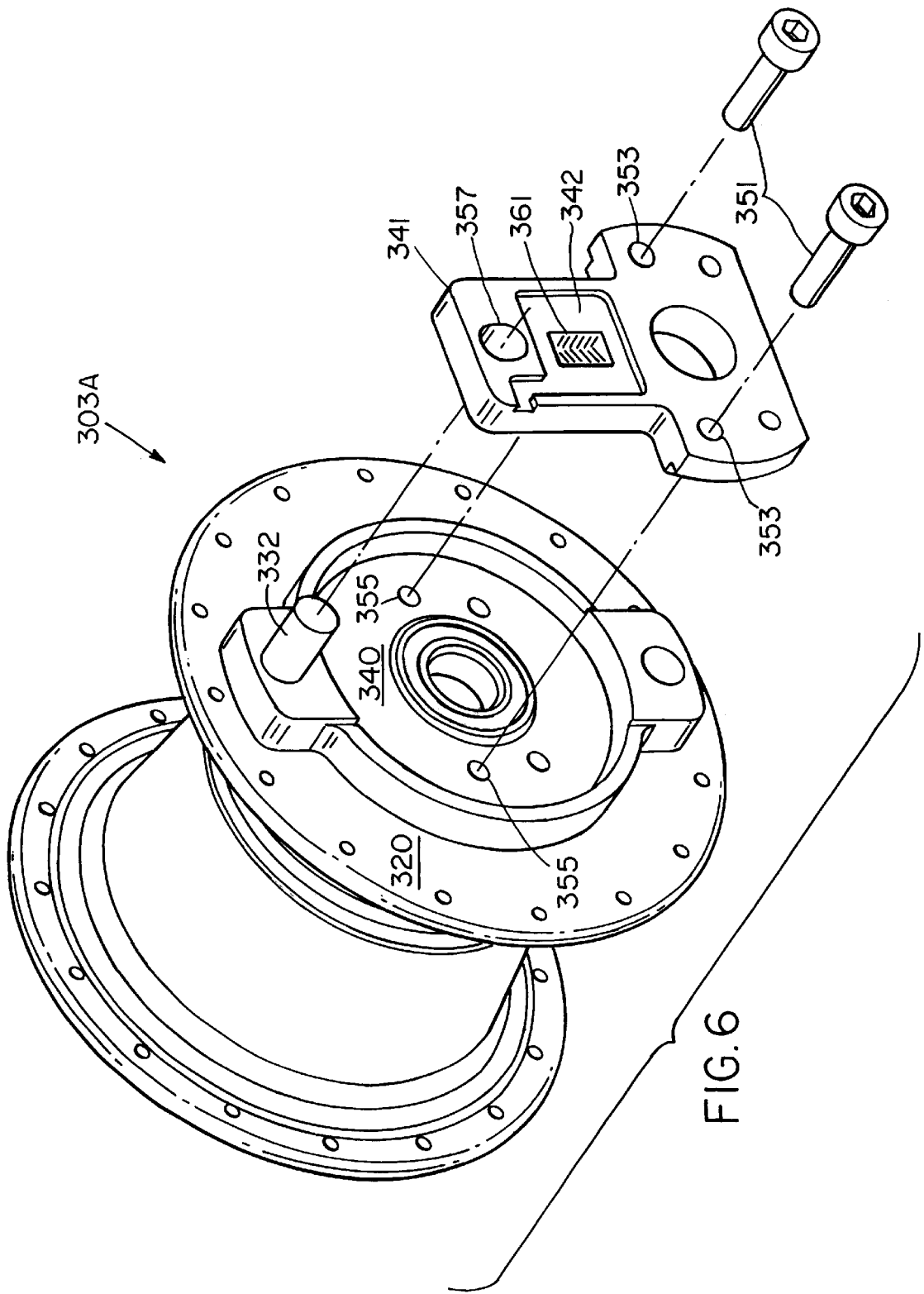
FIG. 6 contains a partial detailed schematic exploded view of a portion of the torque sensing wheel hub of FIG. 4 which illustrates one embodiment of a link using a shear web region in accordance with the invention.

In the embodiment shown in FIGS. 4 and 5, the inner hub member 340 is connected to the flange body 320 by a linking member 341, which is shown in detail in FIG. 6, which is a schematic perspective view of the hub assembly 303A and linking member 341. The linking member 341 is attached to the inner hub member 340 by screws or bolts 351 which pass through clearance holes 353 in the linking member 341 and are threaded into threaded holes 355 at the end of the inner hub member 340. The upper portion of the linking member 341 is attached to the outer hub or flange body 320 by a pin 332 which is fixedly attached to the flange body 320 such as by a press fit. The pin 332 passes through hole 357 in the linking member 341, thus maintaining the upper portion of the linking member 341 stationary with respect to the flange body 320.

The linking member 341 includes a shear web region 342 produced by forming a pocket of reduced thickness in the linking member 341. The shear web region is outfitted with one or more strain gauges 361 which are bonded to the shear web region. The strain gauges can be oriented to measure tension and/or compression strain due to shear and/or bending forces in the shear web region 342.

In operation, rotational forces are applied to the chain sprocket (not shown) which is fixedly attached to the outer diameter of the free hub 326. The applied torque is coupled through the free hub 326 to the inner hub member 340 and through the linking member 341 to the outer hub member or flange body 320 such that the bicycle wheel can be carried into rotation. The strain gauges 361 measure strain in the shear web region 342 of the linking member 341 such that an indication of torque applied to the hub assembly 303A can be obtained.

Under applied torque, the shear web region 342 of the linking member 341 deforms, which causes the strain gauges 361, which are bonded to the surface of the shear web region 342, also to deform. The deformation of the strain gauges 361 changes their resistance. The change in resistance can be related to a mechanical deformation in the shear web region 342. Thus, the change in resistance can be related to the force applied to the linking member 341. Since the application of the force on the linking member 341 is a known distance from the center of rotation of the hub assembly 303A, and it is known that Torque=Force×Distance from center of rotation, the torque applied to the hub assembly 303A can be determined by measuring the resistance in the strain gauges 361. It should be noted that a resistance measurement can be taken before a torque is applied so a reference point can be established.

The strain signals from the strain gauges 361 are coupled by wires 397 to an electronics unit 335 mounted at the end of the hub assembly 303A. The electronics unit 335 includes a housing 334 and a cover 336. Within the housing are located a battery 393 which powers the electronics and a printed circuit board 338 containing the circuitry required to process the strain signals. One or more transmitters 390 can be used to transmit the strain signals to the remote receiver and/or the computer, where the signals can be processed to produce torque and/or power measurements.

The electronics unit 335 can also include a reed switch 391 which can be used to measure the angular velocity of the wheel of the bicycle as it rotates. The reed switch 391 can be mounted on the printed circuit board 338 as shown. The link side spacer 321, mounted at the end of the hub assembly 303A in fixed relation with the stationary axle 102, carries a stationary magnet 392 in proximity to the reed switch 391. As the hub assembly 303A rotates about the axle 102, the reed switch 391 is carried past the stationary magnet 392 once per revolution to activate the reed switch 391. The signal generated by the reed switch 391 can be monitored to determine the angular velocity of the hub assembly 303A and, therefore, the bicycle wheel. Closures of the reed switch 391 can be counted against the real-time clock in the computer 1 of the system to compute angular velocity. The angular velocity can then be used along with the torque computed from the strain measurement to generate a measurement of power delivered to the hub assembly 303A.

Figure 7:
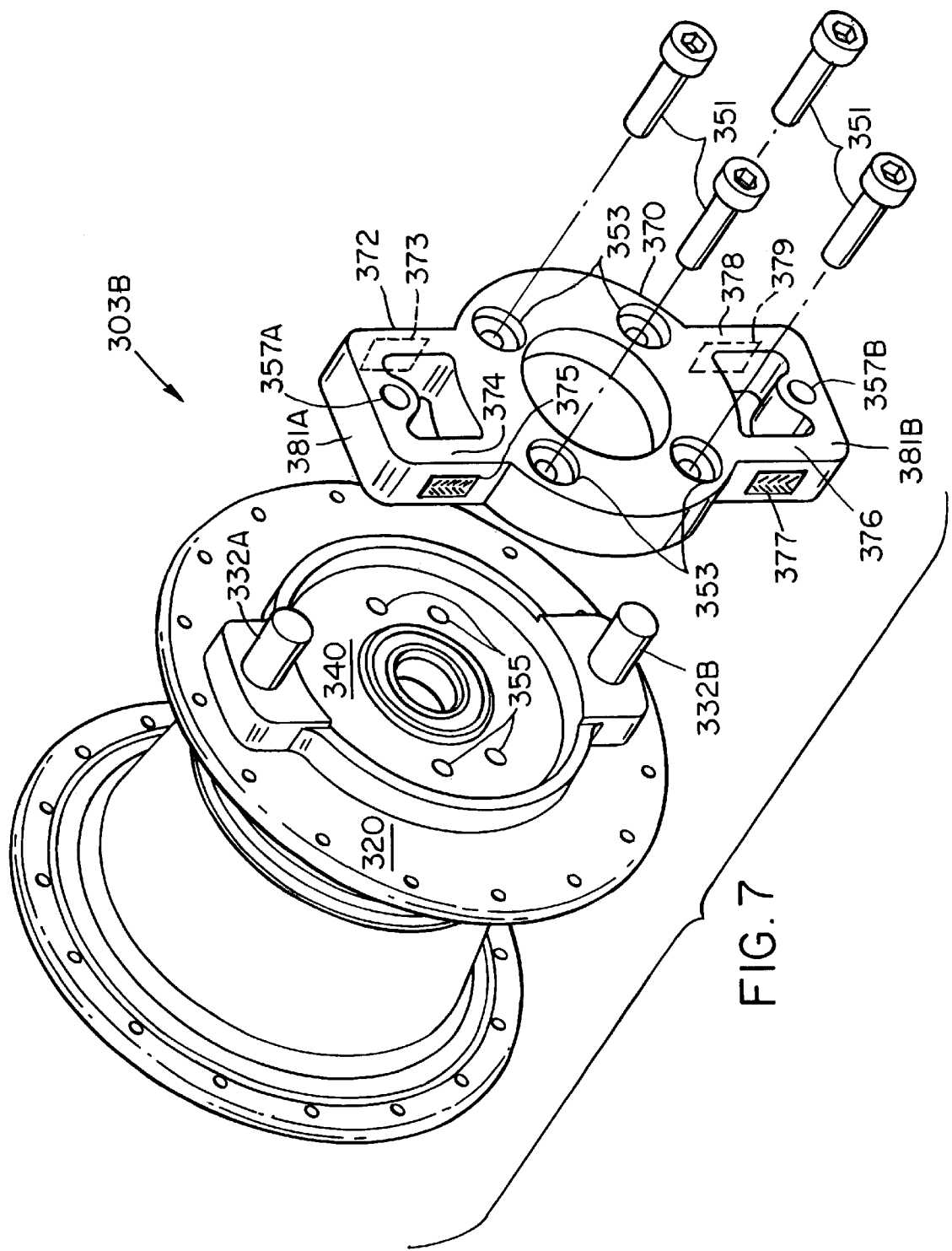
FIG. 7 contains a partial detailed schematic exploded view of a portion of the torque sensing wheel hub of FIG. 4 which illustrates an alternative embodiment of a link in accordance with the invention which uses four bending beams.

FIGS. 7, 8 and 9 are schematic exploded views of alternative embodiments 303B, 303C, 303D, respectively, of the hub assembly described above in connection with FIGS. 4–6. In each of these embodiments, a different linking member is used to connect the inner hub member 340 to the outer hub member or flange body 320. Each of the link members is configured to measure strain in the link member caused by torque applied to the hub assembly 303. In each of the embodiments, the linking member is attached to the inner hub member 340 by screws or bolts 351 passing through clearance holes 353 in the linking member and threading into threaded holes 355 in the inner hub member 340.

In FIG. 7, the linking member 370 also includes upper and lower lateral cross regions 381A and 381B which are held stationary with respect to the outer flange body 320 by mounting pins 332A and 332B passing through respective clearance holes 357A and 357B. Each of the lateral cross regions 381A, 381B is connected to the body of the linking member 370 by a pair of bending arms, each of which can be outfitted with one or more strain gauges. Bending arms 372 and 374, which can include strain gauges 373 and 375, respectively, connect lateral cross region 381A to the body of the linking member 370. Bending arms 376 and 378, which can be outfitted with strain gauges 377 and 379, respectively, connect lateral cross region 381B to the body of the linking member 370.

When torque is applied to the hub assembly 303B, bending strain is caused in the four bending arms 372, 374, 376, 378. The resulting tension and/or compression strain signals generated by the strain gauges are transmitted to the electronics unit 335 by wires 397, where they are processed and transmitted by transmitter 390 to the computer. The strain signals can be converted into torque measurements which can in turn be used to determine power delivered to the hub assembly 303B.

FIG. 8 shows another embodiment 303C of the hub assembly of the invention in which the linking member 380 includes two bending beams 382 and 384 which connect a lateral cross region 389 to the body of the linking member 380. The cross region 389 is held stationary with respect to the flange body 320 by a pin 332 in a hole 357 in the linking member 380. Each of the bending arms 382 and 384 is outfitted with one or more strain gauges 383 and 385, respectively, such that as torque is applied to the hub assembly 303C, strain can be detected in the bending arms 382, 384. As in the previously described embodiments, the strain signals are coupled to the electronics unit 335 for processing.

FIG. 9 shows another embodiment 303D of the hub assembly in accordance with the invention. In this embodiment, a linking plate 359, secured to the inner hub member 340 by screws 351 in a fashion similar to that described above, is attached by an attachment pin 365 to a strain link 356. The strain link can be outfitted with one or more strain gauges 363. The strain link 356 is held stationary with respect to the flange body 320 by a pin 332 passing through a hole 357 in the strain link 356. Once again, when torque is applied to the hub assembly 303D, strain signals are registered by the strain gauges 363. The signals can be processed by the electronics unit 335 and/or computer to produce torque and/or power measurements.

The reed switch 391, activated as the wheel begins to turn, can also be used to turn the system on. This feature serves to activate the electronics unit 335 from a sleep mode in which no strain measurements are taken. When the sleep mode terminates, the rotating driven wheel will start a strain sampling routine to generate the torque measurements in accordance with the invention. A period of inactivity of the reed switch can start a timer in the computer 1, which turns the system off after a predetermined time-out period expires.

FIG. 10 contains a schematic perspective view of a spoked bearing 398 in accordance with the invention which can be used as an alternative to the outer hub bearings 323A and 323B. These spoked bearings 398 can be used in place of the outer hub bearings 323 to support the flange body 320 on the inner hub body 340, keeping one coaxial with the other. In use, the spoked bearings 398 can be fixedly attached at their outer diameters to the flange body 320 and at their inner diameters to the inner hub member 340. Under applied torque, the spoked bearings 398 deflect slightly in the direction of rotation. The spoked bearings 398 have a characterized stiffness in the direction of rotation, and this stiffness is accounted for in the overall system's calculation of total torque based on strain readings from the strain gauges. The use of these spoked bearings 398 can reduce the load on the linking member and can reduce the overall system cost.

Figure 11:
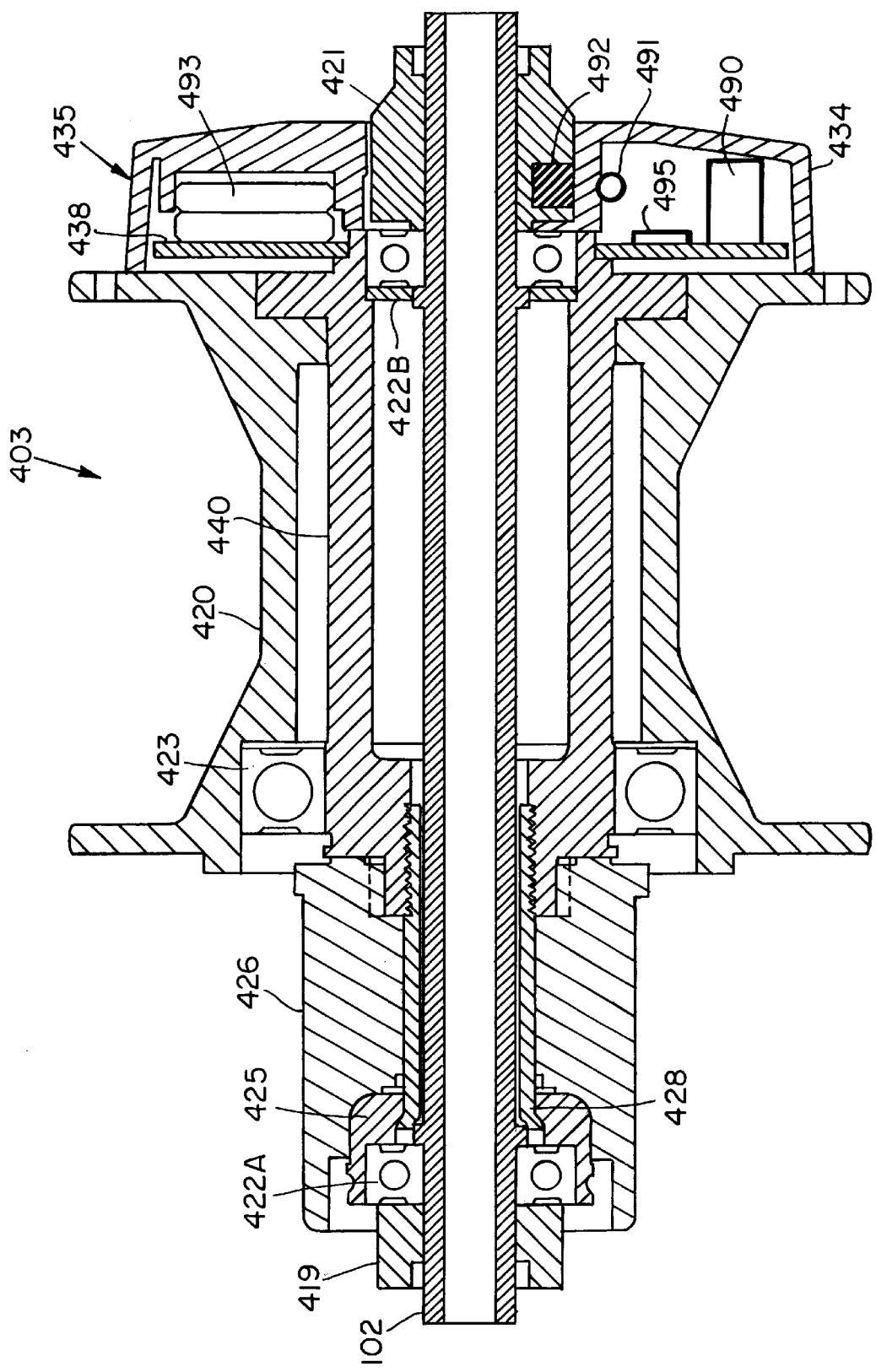
FIG. 11 contains a detailed schematic cross-sectional view of an alternative embodiment to the embodiment of FIG. 4 of a torque sensing wheel hub in accordance with the invention.
Figure 12:
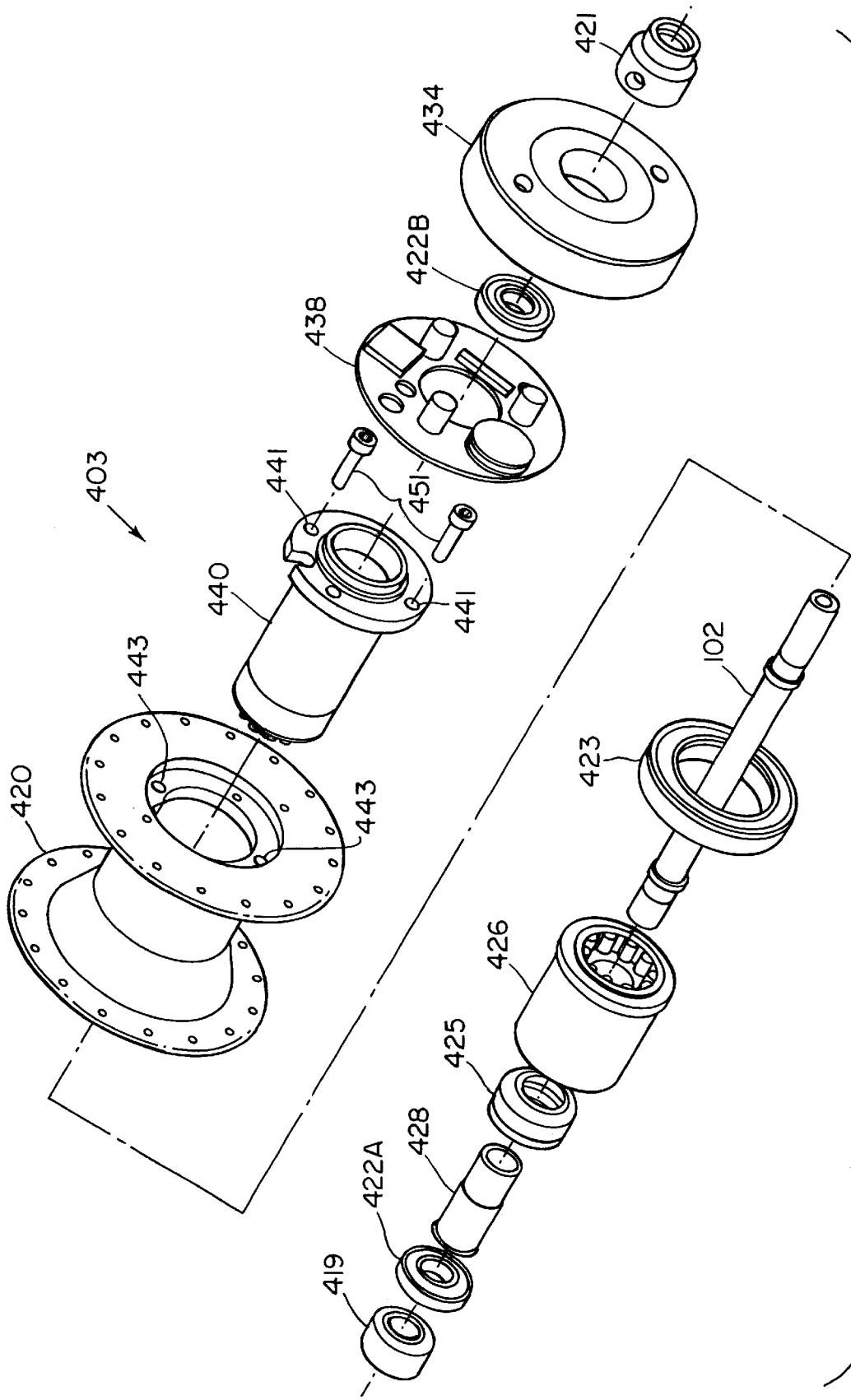
FIG. 12 contains a schematic exploded view of the torque sensing wheel hub of FIG. 11.

FIG. 11 is schematic cross-sectional diagram of another embodiment of a hub assembly 403 in accordance with the present invention. FIG. 12 is a schematic exploded view of the hub assembly 403 of FIG. 11. In this embodiment, torque is not determined by measuring strain in a linking member which couples the inner hub to the outer hub, as is done in the previously described embodiments. Instead, in the hub assembly 403 of FIGS. 11 and 12, the inner hub member 440 is substantially rigidly attached to the outer hub member or flange body 420, and torque applied to the hub assembly 403 is determined by sensing strain in one of the hub members caused by the torsional forces acting on the hub member. In this particular embodiment, strain is detected in the inner hub member 440 by strain gauges 460 (see FIG. 13) bonded to the body of the inner hub member 440.

In this embodiment, the inner hub member 440 is mounted within the flange body 420 in substantial rotationally rigid fashion such as by screws 451 that pass through clearance holes 441 of the inner hub 440 and fasten to the threaded holes 443 of the flange body 420. Because of the rigid attachment at one end, only one outer hub bearing 423 is used at the opposite end to maintain the inner hub member 440 and flange body 420 in substantial coaxial relation.

In similar fashion to the previously described embodiments, a free hub fixing bolt 428 passes through a bearing adapter 425 and holds a free hub 426 to the inner hub member 440. An axle bearing 422A is held within the bearing adapter 425 and a second axle bearing 422B is held at the opposite end of the hub assembly 403 such that the hub assembly 403 is maintained in coaxial relation with the axle 102 and freely rotates about the axle 102. A drive side spacer 419 and a link side spacer 421 are mounted in fixed relation to the axle 102 to position the hub assembly 403 with respect to the axle 102.

The hub assembly 403 also includes an electronics unit 435 which carries out functions similar to those of the electronics unit 335 in the previously described embodiments. The electronics unit 445 includes a printed circuit board 438 on which can be mounted one or more transmitters 490 and other processing circuitry 495 used to process strain signals from the strain gauges 460. One or more batteries 493 also can be mounted within the electronics unit 435 to power the electronics and provide the drive signals to the strain gauges 460. A reed switch 491 can also be included in the electronics unit 435 which, in conjunction with a magnet 492 mounted to the link side spacer 421, detects angular velocity as the hub assembly 403 and bicycle wheel rotate. The angular velocity measurement is used with the sensed torque to determine power delivered to the hub assembly 403. Wires 497 connect strain gauges 460 to printed circuit board 438.

Figure 13:
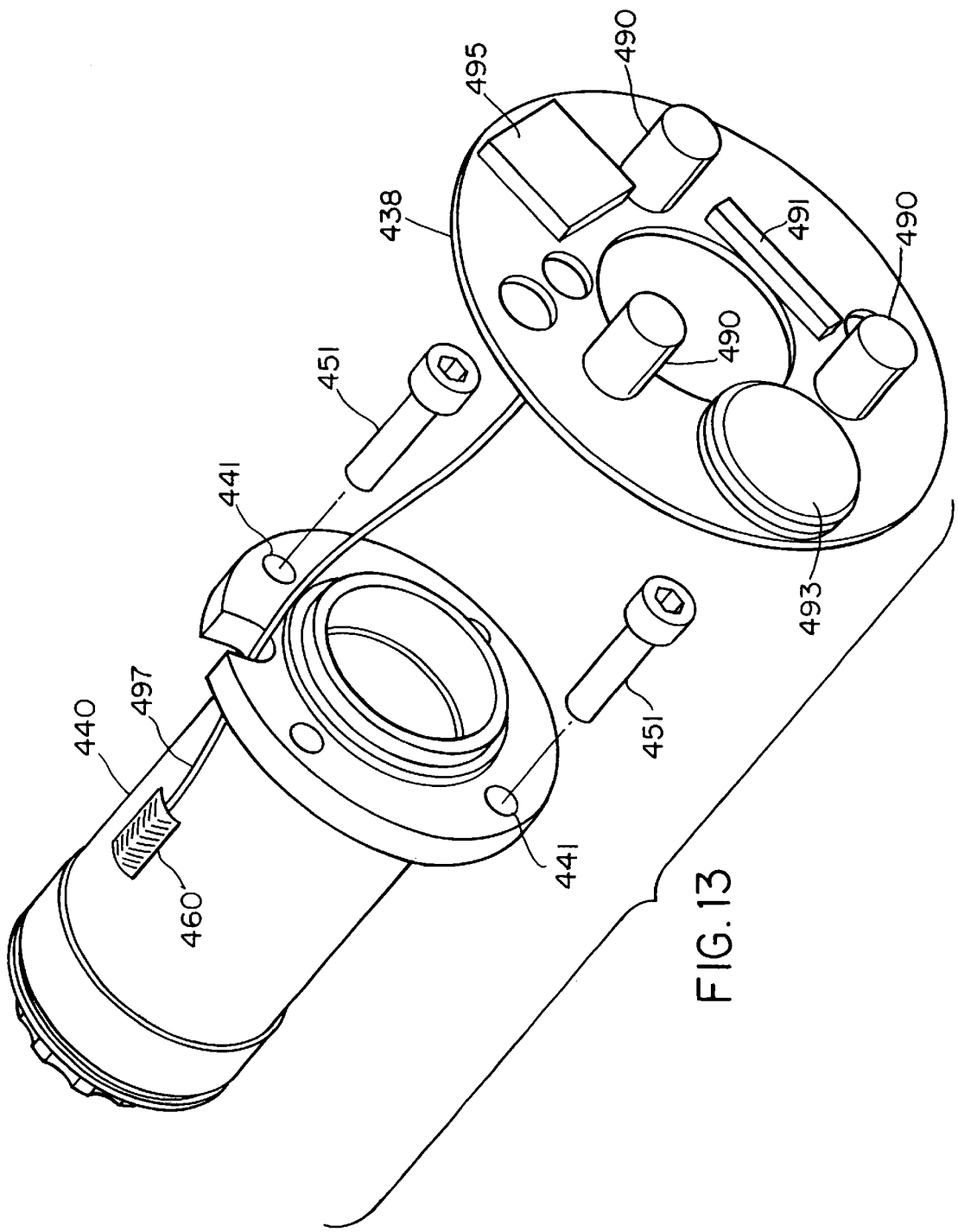
FIG. 13 contains a schematic perspective view of one embodiment of an inner hub member used in the wheel hub of FIG. 11 in accordance with the invention.

FIG. 13 is a schematic perspective view of a portion of the hub assembly 403. The drawing shows the inner hub member 440 and printed circuit board 438. As shown, the inner hub member 440 has bonded to its outer surface multiple strain gauges 460 used to measure tension and/or compression strain in the hub member 440 due to torsional, shear and/or bending forces applied to the hub member 440. As torque is applied to the hub assembly 403, distortions in the inner hub member 440 due to torsional, shear and/or bending forces are detected by the strain gauges 460. Signals generated by the strain gauges are processed by the electronics unit 335 to obtain a measurement of the applied torque.

Figure 14:
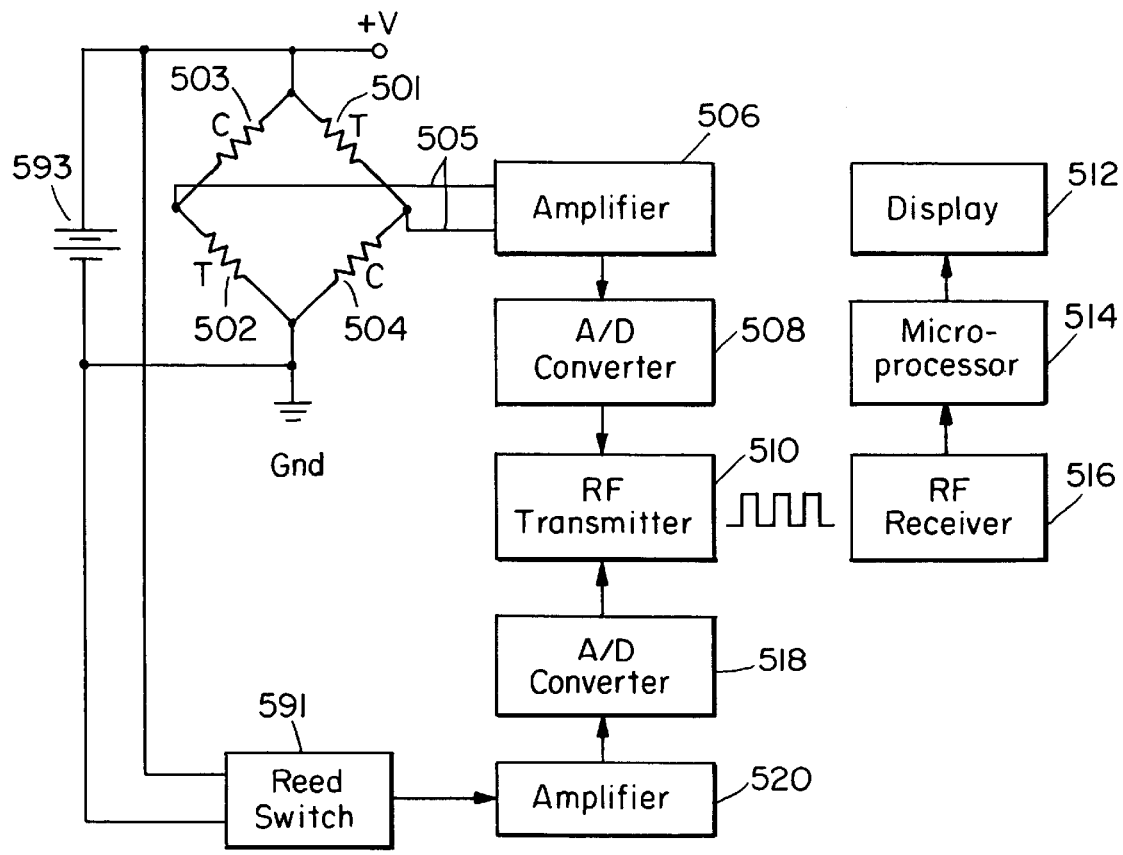
FIG. 14 contains a schematic electrical block diagram for one embodiment of the electronics used in connection with the power sensing apparatus and method of the invention.

FIG. 14 is a schematic electrical block diagram which shows one embodiment of electronic circuitry which can be used to detect strain, torque, angular velocity and/or power in a hub assembly in accordance with the invention. As shown, in one configuration, four strain gauges 501, 502, 503, 504 can be connected as shown in a bridge configuration. Two tension gauges 501 and 502 can be connected as shown in opposite arms of the bridge, and two compression gauges 503, 504 can be connected in the remaining two opposite arms. As shown, the battery 593 can be applied to the bridge to apply the excitation signal V+ to the bridge.

When the component to which the strain gauges are bonded undergoes tension and/or compression distortion due to applied torque, the resistances of the strain gauges change such that an imbalance is introduced into the bridge. As a result, a signal is developed on lines 505 which is indicative of the imbalance and, therefore, the strain. The signal on line 505 is conditioned by amplifier 506, and the amplified signal is transferred to an analog-to-digital converter 508, which converts the amplified signal into digital form. The digital data are then transferred to the RF transmitter 510 which transmits the signals to the RF receiver 516. The transmitted digitized strain signals are then transferred to a microprocessor 514 which computes a torque measurement from the strain signals. The torque measurement can then be displayed on a display 512.

The battery is also applied across the reed switch 591. As described above, as the magnet passes the reed switch, it activates the reed switch to generate a pulse-type signal. The signal is transferred to amplifier 520 which conditions the signal as necessary and passes the signal to another analog-to-digital converter 518. The signal is digitized and transferred to the RF transmitter 510 which transmits the digital data to the RF receiver 516. The data are then passed to microprocessor 514 which can use the data to compute the angular velocity of the wheel. This information can then be used in conjunction with the torque computation to provide an indication of power provided to the hub assembly.

All of the data processed by the microprocessor 514 can be displayed on the display 512 in any desired format. This information includes strain, torque, power, velocity, and other data as desired. The instantaneous power, average power and maximum power acquired during an exercise session, as well as typical cycle computer functions such as clock, time, distance and speed functions, can also be displayed.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A measuring apparatus for a driven wheel, wherein said driven wheel is adapted to be in circumferential contact with a stationary member and receives a rotational driving force from a driving member, wherein said rotational driving force is operable to drive the driven wheel into rotation to propel the driven wheel into a translational motion relative to the stationary member, the measuring apparatus comprising:

a torque coupling member adapted to be drivingly interconnected between the driven wheel and the driving member for transferring the rotational driving force to the driven wheel to drive the driven wheel into rotation, and sensing means directly connected to the torque coupling member for generating a signal indicative of strain in the torque coupling member;

wherein the direct connection of the sensing means to the torque coupling member provides direct indication of torque in the torque coupling member without intermediate mechanical parts between the sensing means and the torque coupling member.

2. The measuring apparatus of claim 1 wherein the driven wheel is a bicycle wheel.

3. The measuring apparatus of claim 1 further comprising means for transmitting the signal indicative of strain in the torque coupling member to a receiver.

4. The measuring apparatus of claim 3 wherein the means for transmitting comprises a radio frequency (RF) transmitter.

5. The measuring apparatus of claim 1 wherein the sensing means includes a battery mountable on the driven wheel to power the sensing means.

6. The measuring apparatus of claim 1 further comprising means for determining angular velocity of the driven wheel.

7. The measuring apparatus of claim 1 further comprising means for determining power delivered to the driven wheel using the signal indicative of strain in the torque coupling member.

8. The measuring apparatus of claim 1 wherein the torque coupling member is mountable in a hub assembly of the driven wheel.

9. The measuring apparatus of claim 1 wherein the sensing means is rotatable with the driven wheel as the driven wheel rotates.

10. The measuring apparatus of claim 9 wherein the sensing means generates the signal indicative of strain in the torque coupling member as the driven wheel rotates.

11. The measuring apparatus of claim 1 wherein the sensing means generates a signal indicative of strain due to bending in the torque coupling member.

12. The measuring apparatus of claim 1 wherein the sensing means generates a signal indicative of strain due to shear in the torque coupling member.

13. The measuring apparatus of claim 1 wherein the sensing means generates a signal indicative of tension strain in the torque coupling member.

14. The measuring apparatus of claim 1 wherein the sensing means generates a signal indicative of compression strain in the torque coupling member.

15. The measuring apparatus of claim 1 wherein the sensing means generates a signal indicative of strain due to torsion in the torque coupling member.

16. The measuring apparatus of claim 1 further comprising:
   a first hub member; and
   a second hub member within the first hub member; wherein
   the torque coupling member couples the first hub member to the second hub member.

17. The measuring apparatus of claim 1 further comprising:
   a first hub member; and wherein
   the torque coupling member comprises a second hub member within the first hub member coupled to the first hub member.

18. The measuring apparatus of claim 17 wherein the first and second hub members are coupled such that relative rotation between the first and second hub members is substantially prevented at one end of the first and second hub members.

19. The measuring apparatus of claim 17 wherein the sensing means generates a signal indicative of strain in the second hub member.

20. The measuring apparatus of claim 17 wherein the sensing means generates a signal indicative of strain due to torsion in the second hub member.

21. The measuring apparatus of claim 17 wherein the second hub member is coupled to the first hub member by a fastening member.

22. The measuring apparatus of claim 21 wherein the fastening member comprises at least one key.

23. The measuring apparatus of claim 21 wherein the fastening member comprises a spline.

24. The measuring apparatus of claim 21 wherein the fastening member comprises at least one screw.

25. The measuring apparatus of claim 21 wherein the fastening member comprises at least one pin.

26. The measuring apparatus of claim 17 wherein the first and second hub members are a single unit.

27. The measuring apparatus of claim 1 wherein the sensing means comprises at least one strain gauge.

28. A driven wheel comprising:
   an outer circumferential member contactable with a stationary member, the driven wheel receiving a rotational driving force from a driving member, said rotational driving force driving the driven wheel into rotation to propel the driven wheel into a translational motion relative to the stationary member while the outer circumferential member contacts the stationary member;
   a torque coupling member mounted within the driven wheel and interconnected with the driving member, wherein the torque coupling member transfers the rotational driving force to the driven wheel to drive the driven wheel into rotation; and
   sensing means mounted directly to the torque coupling member for generating a signal indicative of strain in the torque coupling member;
   wherein the signal indicative of strain in the torque coupling member provides a direct indication of torque in the torque coupling member without intermediate mechanical parts between the sensing means and the torque coupling member.

29. The driven wheel of claim 28 wherein the driven wheel is a bicycle wheel.

30. The driven wheel of claim 28 further comprising:
   a first hub member; and
   a second hub member within the first hub member; wherein the torque coupling member couples the first hub member to the second hub member.

31. The driven wheel of claim 28 further comprising:
   a first hub member; and wherein
   the torque coupling member comprises a second hub member within the first hub member coupled to the first hub member.

32. A measuring apparatus for a driven wheel, wherein said driven wheel is adapted to be in circumferential contact with a stationary member and to receive a rotational driving force from a power input, comprising:
   a power transfer arrangement interconnected between the input and the driven wheel and having at least one power transfer component, wherein said rotational driving force drives the driven wheel into rotation to propel the driven wheel into a translational motion relative to the stationary member; and
   a sensing means connected directly to the power transfer component for generating a signal indicative of strain in the power transfer component, wherein direct connection of the sensing means to the power transfer component provides a direct indication of torque in the power transfer arrangement without intermediate mechanical parts between the sensing means and the power transfer component, and wherein the sensing means is mountable in the driven wheel such that, when the driven wheel rotates about a driven wheel axis, the sensing means rotates with the driven wheel.

33. The measuring apparatus of claim 32 wherein the driven wheel is a bicycle wheel.

34. The measuring apparatus of claim 32 wherein the sensing means comprises at least one strain gauge.

35. The measuring apparatus of claim 32 wherein the sensing means comprises a battery for powering the sensing means.

36. The measuring apparatus of claim 32 wherein the sensing means comprises a transmitter for transmitting the signal indicative of strain in a component of the driven wheel to a receiver.

37. The measuring apparatus of claim 35 wherein the transmitter comprises a radio frequency (RF) transmitter.

38. A method of measuring strain in a driven wheel comprising:
   providing the driven wheel with an outer circumferential member adapted to contact a stationary member;
   coupling a rotational driving force from a driving member to the driven wheel by mounting a torque coupling member within the driven wheel and drivingly interconnecting the torque coupling member with the driving member, wherein said rotational driving force drives the driven wheel through the torque coupling member into rotation to propel the driven wheel into a translational motion relative to the stationary member using the contact between the outer circumferential member and the stationary member; and
   connecting a sensor directly to the torque coupling member without any intermediate mechanical parts therebetween, wherein the sensor is operable to provide a signal directly indicative of strain in the torque coupling member which corresponds to a direct indication of torque in the torque coupling member.

39. The method of claim 38 wherein the driven wheel is a bicycle wheel.

40. The method of claim 38 further comprising transmitting the signal indicative of strain in the torque coupling member to a receiver.

41. The method of claim 38 further comprising determining angular velocity of the driven wheel.

42. The method of claim 38 further comprising determining power delivered to the driven wheel using the signal indicative of strain in the torque coupling member.

43. The method of claim 38 wherein the torque coupling member is mounted in the driven wheel such that the sensing means is rotatable with the driven wheel as the driven wheel rotates.

44. The measuring apparatus of claim 3 wherein the receiver comprises:
   means for receiving the signal indicative of strain in the torque coupling member; and
   a sensor for sensing angular velocity of the driven wheel as it rotates.

45. The measuring apparatus of claim 44 wherein:
   the driven wheel is the driven wheel of a bicycle; and
   the receiver is mounted on a frame of the bicycle in proximity to the driven wheel.

46. The measuring apparatus of claim 45 wherein the sensor comprises a reed switch such that a magnet mounted on the driven wheel passing in proximity to the reed switch as the driven wheel rotates activates the reed switch to generate a signal indicative of angular velocity of the driven wheel.

47. The measuring apparatus of claim 44 wherein the sensor comprises a reed switch such that a magnet mounted on the driven wheel passing in proximity to the reed switch as the driven wheel rotates activates the reed switch to generate a signal indicative of angular velocity of the driven wheel.

48. The measuring apparatus of claim 44 further comprising a housing at least partially enclosing the sensor and the means for receiving the signal indicative of strain in the torque coupling member.

49. A torque coupling arrangement for interconnection between a driving member and a wheel for rotating the wheel about an axis of rotation, comprising:
   a first force transferring member drivingly interconnected with the driving member in a first location so as to be rotatable in response to rotation of the driving member, wherein the first force transferring member includes at least one laterally extending wall extending in a direction substantially parallel to the axis of rotation of the wheel;
   a second force transferring member drivingly interconnected with the wheel and drivingly interconnected with the first force transferring member at a second location laterally spaced from the first location, wherein the laterally extending wall extends between the first and second locations, wherein the second force transferring member is rotatable in response to rotation of the first force transferring member for imparting rotation to the wheel; and
   a strain sensor connected to the laterally extending wall of the first force transferring member for generating a single indicative of strain in the wall to provide an indication of torque in the torque coupling arrangement.

50. The torque coupling arrangement of claim 49 wherein the first force transferring member comprises a tubular member defining an internal passage through which the driving member extends.

51. The torque coupling member of claim 50, wherein the tubular first force transferring member defines a first end drivingly interconnected with the driving member at the first location, and a second end drivingly interconnected with the second force transferring member at the second location, wherein the wall of the tubular first force transferring member extends between the first and second ends.

52. A torque measuring arrangement for a drive system including a wheel having a hub defining an interior, wherein the wheel is rotatable about an axis of rotation, and wherein the drive system further includes a rotary power input arrangement, comprising:
   a torque coupling member located within the hub interior, wherein the torque coupling member includes a power input section drivingly coupled to the rotary power input arrangement and wherein the torque coupling member is drivingly engaged with the hub at a location spaced from the power input section, wherein the torque coupling member further includes a wall extending therebetween; and
   one or more strain sensors mounted to the wall of the torque coupling member, wherein the one or more strain sensors generate a signal indicative of strain in the wall to provide an indication of torque in the torque coupling member.

53. The torque measuring arrangement of claim 52, wherein the torque coupling member comprises a tubular member defining first and second ends, wherein the wall of the torque coupling member is defined by a wall of the tubular member which extends between the first and second ends, wherein the first end of the tubular member is drivingly coupled to the rotary power input arrangement, and wherein the second end of the tubular member is coupled to the hub.

54. The torque measuring arrangement of claim 53, wherein the tubular member extends along a longitudinal axis, wherein the longitudinal axis of the tubular member is coincident with the axis of rotation of the wheel.

55. The torque measuring arrangement of claim 54, wherein the rotary power input arrangement includes a shaft, wherein the shaft extends from the second end of the tubular member to the first end of the tubular member through an internal passage defined by the tubular member, and wherein the shaft is coincident with the longitudinal axis of the tubular member and with the axis of rotation of the wheel.

56. The torque measuring arrangement of claim 53, wherein the wall of the tubular member is a substantially continuous wall extending between the first and second ends of the tubular member.

* * * * *

UNITED STATES PATENT AND TRADEMARK OFFICE
CERTIFICATE OF CORRECTION

PATENT NO. : 6,418,797 B1
DATED : July 16, 2002
INVENTOR(S) : Jesse Ambrosina et al.

It is certified that error appears in the above-identified patent and that said Letters Patent is hereby corrected as shown below:

Column 16,
Line 39, delete "35" and substitute therefore -- 36 --;

Column 17,
Line 55, delete "single" and substitute therefore -- signal --;

Column 18,
Line 1, after "49" insert -- , --.

Signed and Sealed this

Sixteenth Day of September, 2003

JAMES E. ROGAN
*Director of the United States Patent and Trademark Office*